Aug. 3, 1926.  1,594,951

C. N. HEADDING ET AL

PROJECTION SCREEN

Original Filed July 7, 1922

Inventors
C. N. Headding,
F. M. Kent
Victor J. Evans.
By          Attorney

Patented Aug. 3, 1926.

1,594,951

UNITED STATES PATENT OFFICE.

CLAY NORRIS HEADDING AND FRANCIS MITCHELL KENT, OF CHEHALIS, WASHINGTON.

PROJECTION SCREEN.

Application filed July 7, 1922, Serial No. 573,260. Renewed December 29, 1925.

This invention relates to improvements in screens and has particular reference to that type of screen commonly employed for projecting pictures thereon. These screens are common in amusement places.

The principal object of this invention is to produce a screen wherein the picture thrown thereon is projected therethrough and is not viewed from the projecting side.

Another object is to employ several screens of this character wherein the light will be transmitted therethrough, thus producing a stereoscopic effect.

Other objects and advantages will be apparent during the course of the following description.

Figure 1:
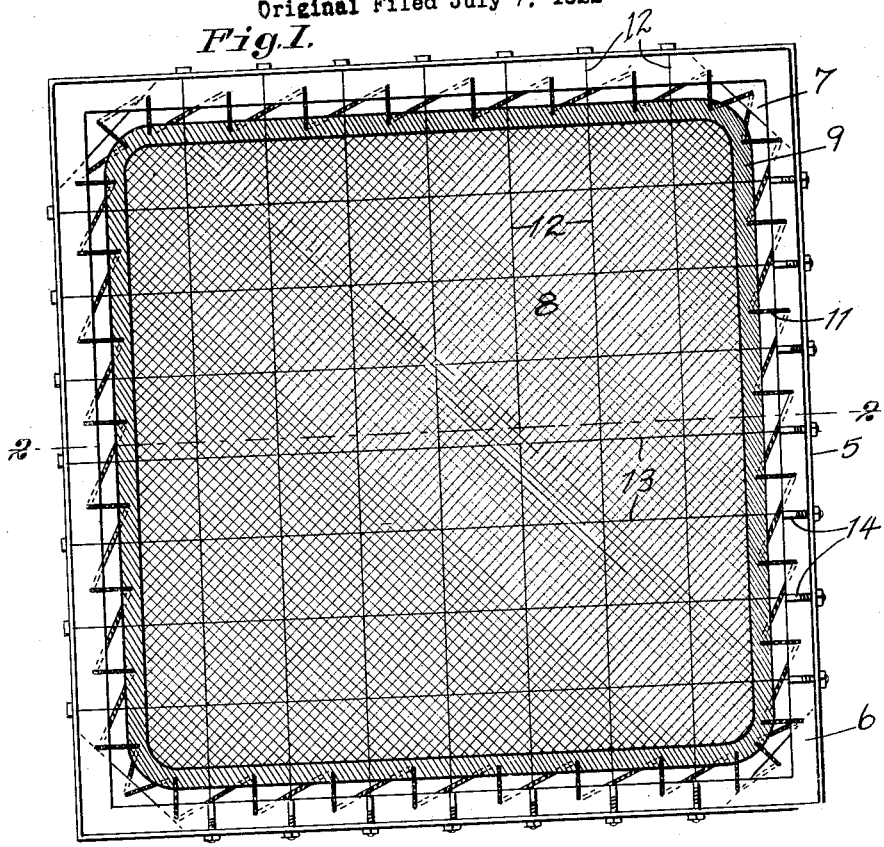
Figure 2:
Figure 3:

In the accompanying drawings forming a part of this specification, and in which like numerals are employed to designate like parts throughout the same, Figure 1 is a vertical elevation of our screen, Figure 2 is a horizontal cross-section on the line 2—2 of Figure 1, and Figure 3 is a modified form showing the employment of a plurality of screens for the purpose of producing a stereoscopic effect.

In the projecting of pictures upon a flat screen, it has been found that the flat plane does not give the true life characteristics to the picture. This is partly due to the fact that the picture is being thrown upon the screen and then being reflected to the person viewing the same. Another reason is that there is no real depth in the picture due to the flat screen, and we propose to overcome these objections by projecting the picture through the screen, which results in a clearness impossible to be secured upon the flat screen which reflects the picture and we further propose to employ two or more screens placed in close proximity one to the other with the result that the person viewing the screens will see the image upon the different screens and in this manner a stereoscopic effect will be produced.

In the accompanying drawings wherein for the purpose of illustration is shown a preferred embodiment of our invention, the numeral 5 designates a frame which is preferably made of T iron and provided with a web 6. This web forms a fastening means for the screen and in order to strengthen the frame, we provide corner pieces 7, which corner pieces are preferably riveted to the webs 6 of the adjacent T irons. Mounted within these frames is a screen proper which consists of a fabric 8, which fabric is suitably treated as with a colorless transparent varnish, and a reenforcing edge 9 is secured around the edge thereof. This reenforcing edge 9 is for the purpose of taking up the strain as the fabric is stretched upon the frame formed by the T irons 5. The numeral 11 designates lacing which passes between the reenforcing edge 9 and the web 6. It will thus be seen that by this manner of mounting our screen, we can stretch our screen tightly in order that the same may be held in a plane parallel to the projector.

When using the screen out of doors, we provide wires as shown at 12 and 13. These wires are adapted to pass across the screen from one side of the frame to the opposite side, both horizontally and vertically on each side of the screen. In order to stretch these wires tightly, we have provided turn buckles 14. The purpose of these wires is to prevent the screen from bulging to any appreciable amount when used where there is considerable draught such as in open air theaters.

By now referring to Figure 3, it will be noted that we have shown three screens suitably spaced apart. This spacing allows the picture to be projected upon one screen and to pass therethrough to the next and on to the next. This projecting through the three screens results in the picture being seen in three planes, thus giving the stereoscopic effect.

It will thus be seen that we have provided a very simple and efficient manner of receiving projected pictures upon a screen which will be more brilliant than those viewed through reflection, and at the same time, we have provided means whereby depth will be given to the picture not possible upon a screen having a single plane surface.

It is to be understood that the form of our invention herewith shown and described is to be taken as a preferred example of the same, and that various changes in the shape, size and arrangement of parts may be resorted to without departing from the spirit of the invention or the scope of the subjoined claim.

Having thus described our invention, we claim:—

In a screen of the character described, a frame formed of T-shaped material having the web thereof projecting inwardly, a plurality of fabrics adapted to be stretched to the web of said frame, a reenforcing edge secured to each of said fabrics and to said frame, spaced horizontal wires extending on both sides of the screen thus formed, spaced vertical wires superimposed on said horizontal wires and in close proximity to said fabrics, for the purpose specified.

In testimony whereof we affix our signatures.

CLAY NORRIS HEADDING.
FRANCIS MITCHELL KENT.